Figure 1:
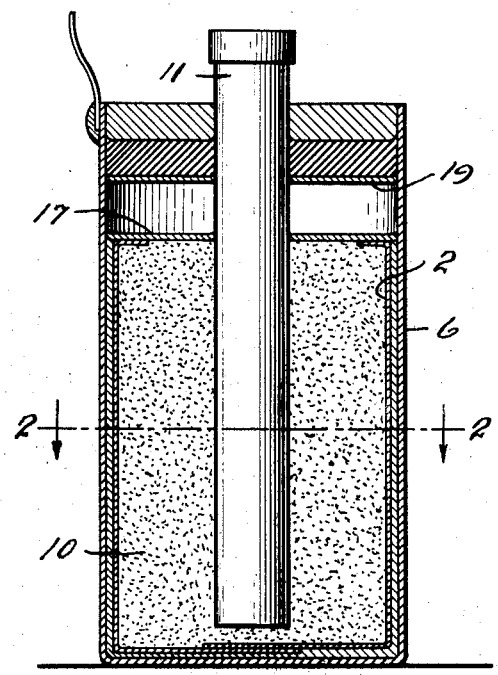

July 20, 1926.

C. P. DEIBEL ET AL 1,593,021

METHOD OF PRODUCING DRY CELLS

Filed August 24, 1925      3 Sheets-Sheet 1

Inventors
Cyril P. Deibel
Walter G. Waitt
By
Hull, Brock & West
Attys.

July 20, 1926.
C. P. DEIBEL ET AL
1,593,021
METHOD OF PRODUCING DRY CELLS
Filed August 24, 1925    3 Sheets-Sheet 2
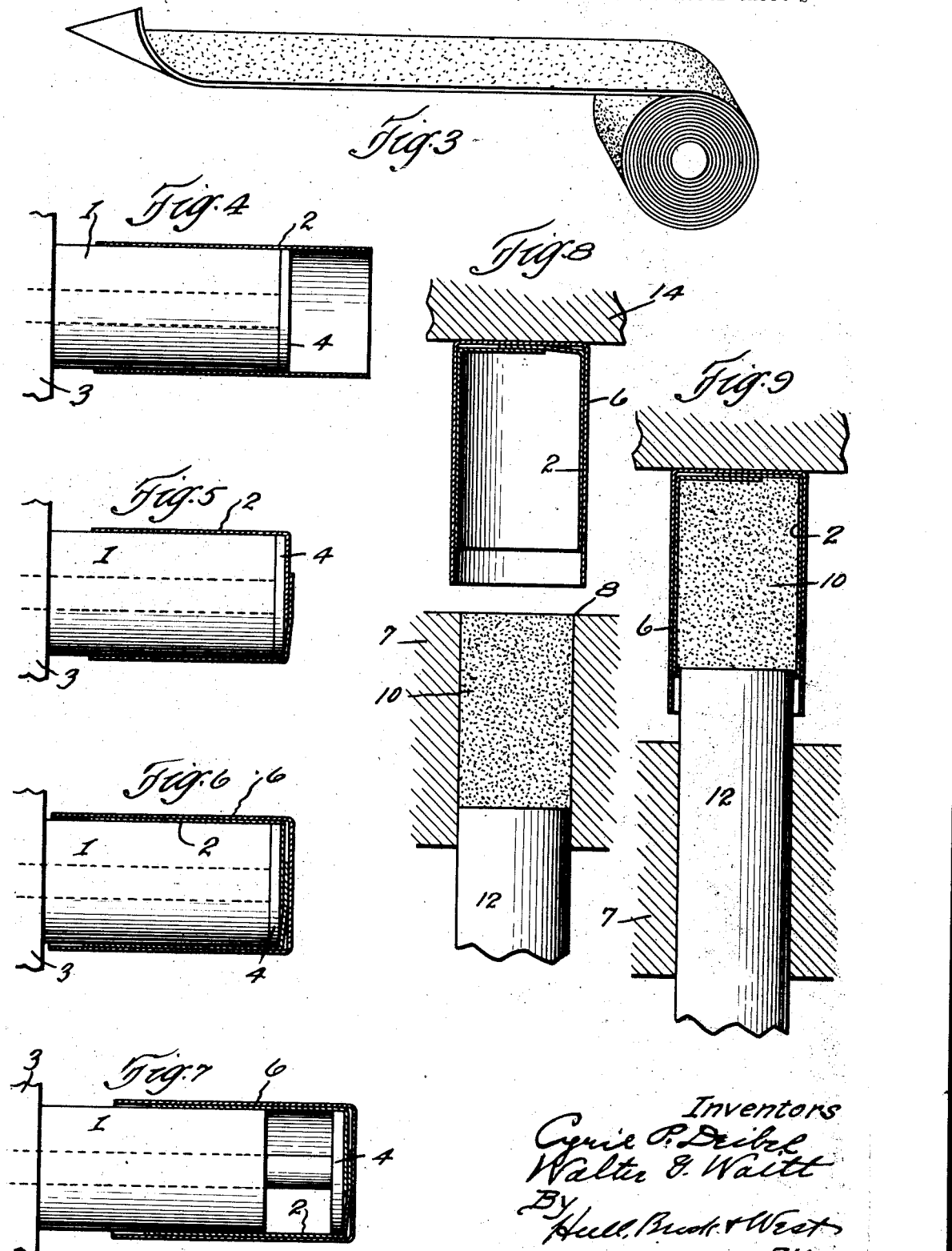

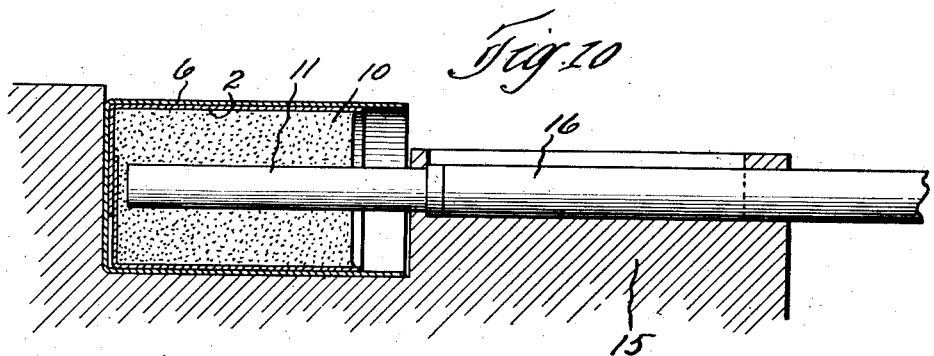
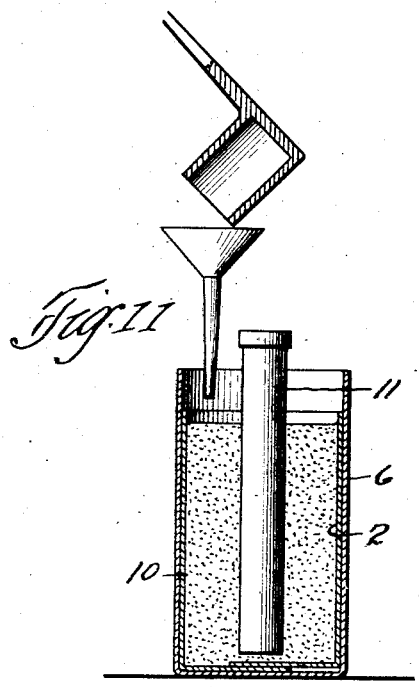
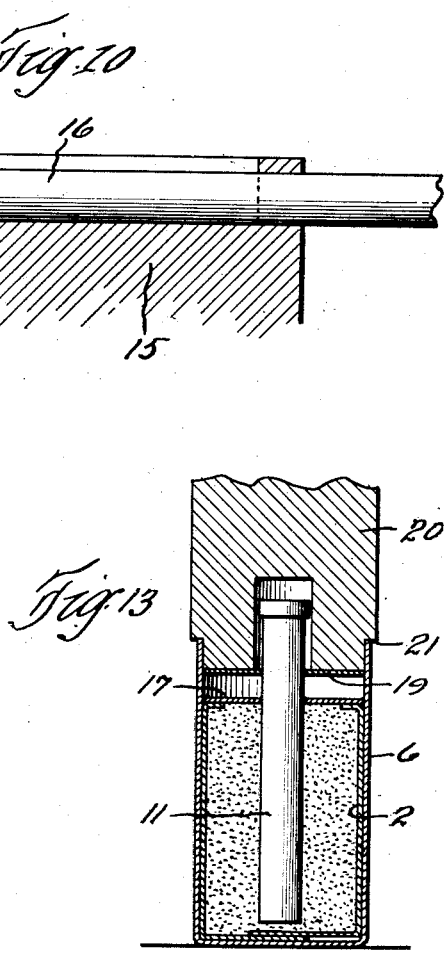
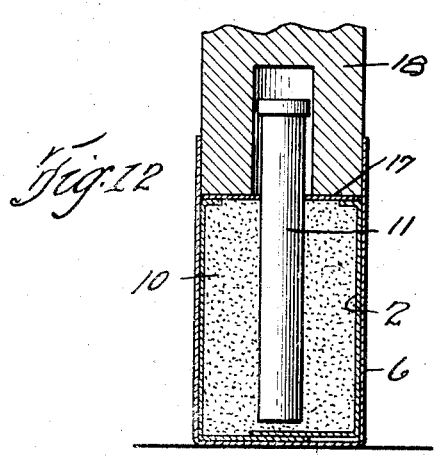
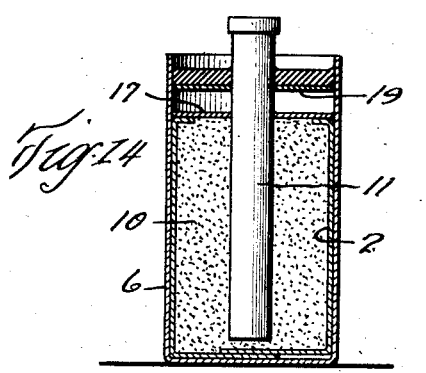

Patented July 20, 1926.

1,593,021

UNITED STATES PATENT OFFICE.

CYRIL P. DIEBEL AND WALTER G. WAITT, OF LAKEWOOD, OHIO, ASSIGNORS TO THE TWIN DRY CELL BATTERY COMPANY, OF CLEVELAND, OHIO, A CORPORATION OF OHIO.

METHOD OF PRODUCING DRY CELLS.

Application filed August 24, 1925. Serial No. 51,964.

The object of this invention is to provide a method of producing dry cells which is adapted to the facilities of automatic manufacture so that a great increase in production, with the resultant decrease in cost, is effected. Furthermore, such method of manufacture, made possible by the novel features of our invention, insures uniform high quality of product.

Another object of our invention is to devise an improved method of producing dry cells and to provide a battery which shall be more efficient in operation and which for the same size or bulk shall have a greater capacity, and shall maintain a higher voltage and a lower internal resistance than any other batteries now known. With this object in view, the present invention consists in the process or method of constructing cells as hereinafter described and more particularly defined in the claims. Our process was evolved primarily for the production of so-called "B" batteries of radio sets. It is to be understood, however, that our invention is equally well adapted to the manufacture of dry cells of all sizes embracing those ranging from the smaller "flash light" sizes to the standard 6 inch size.

It has been quite impossible to make batteries with any degree of rapidity by the methods heretofore employed without an occasional defective cell; and if one cell in the usual B battery of fifteen to sixty cells is defective, the entire battery is correspondingly defective. The battery as a whole is as good as, and no better than its weakest cell.

The most prevalent defect of batteries as heretofore constructed, especially of the variety above emphasized, is contact of the mix with the zinc cup which constitutes the anode. When such contact exists the cell is rendered entirely defective. To obviate this defect there must be an effective and permanent separation between the mix and the cup. Also in the common forms of cells no use is obtained from the bottom of the zinc cup. By virtue of our improved method, the bottom of the cup is just as available for use as the side walls.

Also, in a large percentage cells constructed according to prevailing practice expensive low resistance materials have to be used in order that the cell may properly function under relatively heavy current drains. This employment of expensive low resistance materials is obviated, in our improved method of manufacture, by use of a very thin paper lining and by highly compressing the mix; thus reducing the internal resistance.

A further advantage accruing from our improved process is that more mix may be used in a cup of a given size than was the case with previously used processes. This, with the added use of the bottom of the cup enables the cell to better maintain its voltage under a given drain and materially increases the life of the cell.

Cells constructed in accordance with our method of production may be hermetically sealed, and may include an air space or chamber of ample size to take care of the expansion of gases and any excess of solution in the cells. Our process however is not limited to the production of cells having this hermetic seal or air space.

A further advantage accruing from our improved method of producing dry cells is that the same is better adapted to the facilities of automatic production than is the method disclosed in our Patent No. 1,552,395, Sep. 1, 1925. The process is an improvement on the process disclosed in the aforementioned patent.

It was found more expedient and efficient to insert the lining all the way into the cup before inserting and compressing the mix, for the reason that in the method disclosed in the application referred to wherein the lining instead of being inserted all the way into the cup, was inserted only part way into the cup and was projected all the way into the cup along with the mix, there was danger of some of the mix being forced through the bottom of the lining and coming in contact with the zinc and thereby short circuiting the cell.

Accordingly in our improved process the lining is pushed into the cup until the bottom of the lining contacts with the bottom of the cup. The mix is then inserted and compressed within the lined cup. Cells produced in accordance with this process therefore have a lower percentage of short circuits.

Another advantage of this process results from first inserting and compressing the mix within the lined cup and then forcing the carbon electrode into the mix. This has the effect of further compressing the mix and increasing the density thereof. The result is that the internal resistance of the cell is greatly reduced.

The method.

Our method consists in forming a suitable thin, tough lining of proper width and of such shape as will adapt it for use as a lining for a cup of zinc or similar material which constitutes the anode of the cell.

The lining is usually made of thin, tough material and may have its outer surface coated with a paste. The lining is usually wound about a form to effect a cylinder of one or more thicknesses and one end of the cylinder thus formed is folded inwardly to provide a bottom for the lining. The lining is then inserted into the cup, the upper end of the same terminating shortly below the top of the cup; the purpose of which will hereinafter appear. The cell and lining however can be made in other shapes if desired.

A suitable quantity of substantially dry depolarizing mix is then inserted into the lined cup and tightly compressed therein by means of a plunger. (It is to be noted that the lining is dry when the mix is inserted.) The plunger tightly compacts the mix within the lining. The mix when compressed fills the cup up to a level slightly below the top of the lining.

The next step is the insertion of the carbon electrode or pencil. These carbon sticks or pencils are fed into a suitable guiding means which properly centers the pencil with respect to the cup. A plunger then forces the electrode into the mix which tends to further compress the mix.

A suitable quantity of electrolyte is poured on top of the mix. The cup is then allowed to stand until the electrolyte permeates the mix and completely saturates the lining.

A washer having a diameter of approximately the inner diameter of the cup is then forced into the cup by a suitable plunger. This washer is adapted to engage and turn down that portion of the lining which extends above the mix as hereinbefore referred to. The plunger compresses the washer tightly against the mix and completely covers the same.

A second washer is then inserted into the cup. This washer is similar to the first washer and is inserted by a plunger having a shoulder which limits the distance which the plunger may be inserted within the cup. The purpose of the washers is to form an air space or expansion chamber to allow a space for gases and any excess of solution.

The space above the last washer is then filled with sealing material which is allowed to harden and this completes the cell except for the application of suitable terminals to the cathode and anode.

The drawing.

Figure 2:
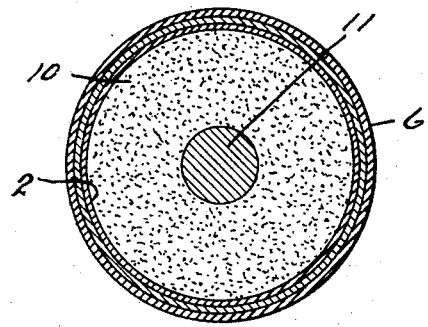

A product of our invention, and an improved means of carrying the method into practice are illustrated in the accompanying drawing wherein Fig. 1 is a central vertical section through a cell produced in accordance with our invention; Fig. 2 is a transverse section on the line 2—2 of Fig. 1 looking in the direction of the arrows; Fig. 3 is a perspective view of a roll of paper from which the lining is formed; Figs. 4 to 14 inclusive illustrate the successive steps of the process or method.

Specific means for practicing the method.

The lining for the cup is formed by wrapping a suitable length of paper about a mandrel 1 to form the lining 2. The mandrel is shown as carried by a suitable support 3. As shown in Fig. 4 the lining is wrapped about the mandrel with a portion thereof protruding slightly beyond the mandrel. This portion is next folded inwardly over the end of the mandrel as shown in Fig. 5. The cup 6 is then inserted over the lining as shown in Fig. 6. The mandrel carries a suitable ejector 4 which is adapted to eject the lined cup as is indicated in Fig. 7.

The cup with the lining therein is now positioned over a mold or container 7 (Fig. 8) having a cavity 8 within which reposes a cake 10 of a suitable depolarizing mix. The cake 10 is supported upon a plunger 12 that fits the cavity 8. The cup rests with its closed end against an abutment 14.

In the next step, as illustrated in Fig. 9, the plunger 12 is advanced to transfer the cake 10 from the mold cavity 8 to the cup. Sufficient pressure is imposed through the plunger upon the cake 10 to compact the mix within the cup.

The next step is the insertion of the carbon electrode as indicated in Fig. 10. The carbon electrodes or pencils 11 are fed into a suitable guiding element 15 which serves to center the electrode with respect to the cup. A suitable plunger 16 now forces the electrode into the cup. The insertion of the electrode further compresses the mix and imparts to it the desired density, which results in practically eliminating the internal resistance of the cell.

The cup is next placed in an upright position as shown in Fig. 11 and an electrolytic solution is poured into the cup as shown in Fig. 11. After the solution has been absorbed, a washer 17 is inserted by means of a suitable plunger 18 as indicated in Fig. 12. This washer is of approximately the same diameter as the inner diameter of the cup and will engage with and turn down that portion of the lining extending above the mix. Sufficient force is applied to the plunger to tightly compress the washer against the mix.

A second washer 19 is then inserted into the cup (Fig. 13). This washer is similar to the first washer and is inserted by means of a plunger 20 having a shoulder 21 which limits the distance to which the same may be inserted within the cup.

The space above the last washer is then filled with a suitable sealing material which is allowed to harden, and this completes the cell except for the application of suitable terminals to the cathode and anode.

Having thus described our invention, what we claim is:—

1. The process of producing dry cells which consists in forming a lining for a cup from a piece of thin absorbent material; inserting the lining all the way to the bottom of the cup, projecting a mass of depolarizing mix into the cup, the diameter of said mass of mix being less than the interior diameter of the lined cup, further compressing the mix within the lined cup, saturating said lining and mix with a suitable liquid, covering said mix with a suitable washer, inserting a second washer spaced from the first washer and sealing the cup.

2. In the process of producing dry cells the steps of forming a lining for the cup from a piece of thin dry absorbent paper, inserting said lining all the way into the cup, projecting into the lined cup a mass of depolarizing mix of less diameter than the interior diameter of the lined cup, further compressing the mix within the lined cup, adding a quantity of liquid, covering said mix with a suitable washer and sealing the cup.

3. In the method of producing dry cells the steps of forming a lining for a cup from a piece of dry, thin absorbent paper, inserting the lining within the cup all the way to the bottom thereof, projecting into the lined cup a mass of depolarizing mix of less diameter than the interior diameter of the lined cup, inserting an electrode within the mix covering said mix with a suitable washer, inserting a second washer spaced from the first washer and sealing the cup.

4. The method of producing dry cells comprising the steps of winding a piece of paper one or more times about a mandrel and folding the paper over the end of the mandrel thereby to produce a lining for the side walls and bottom of the cup, placing the cup over the lining while supported by the mandrel and projecting the lining all the way to the bottom of the cup, removing the lined cup from the mandrel and supporting it with its open end in axial alignment with a mix container, transferring from said mix container a cake of mix of less diameter than the interior diameter of the lined cup and forcing it to the bottom of the cup, introducing a suitable liquid into the cup for saturating the lining and mix, placing a washer within the cup and compressing the same against the mix, placing a second washer in the cup spaced from the first washer and sealing the cup.

5. In the method of producing dry cells the steps of pre-shaping a lining, inserting said lining within a cup all the way to the bottom thereof, pre-shaping a mass of depolarizing mix of less diameter than the interior diameter of the lined cup, inserting said mass of mix into the lined cup and further compressing the same, saturating said mix and lining with an electrolytic solution and sealing the cell.

6. The method of producing dry cells comprising the steps of lining the active surface of the negative element with one or more layers of paste-laden absorbent paper, preshaping a mass of depolarizing mix of less diameter than the interior diameter of the lined cell and projecting said mass of mix into the lining, inserting an electrode within the mix to further compress the same, saturating said mix and lining with a suitable liquid and sealing the cell.

In testimony whereof, we hereunto affix our signatures.

CYRIL P. DEIBEL.
WALTER G. WAITT.